Oct. 26, 1926.　　　　　　　　　　　　　　　　1,604,387
F. E. CALDWELL
MACHINE FOR MEASURING THE SPECIFIC GRAVITY OF A LIQUID
Filed Sept. 11, 1923

WITNESSES

INVENTOR
Frank E. Caldwell,
BY
ATTORNEYS

Patented Oct. 26, 1926.

1,604,387

UNITED STATES PATENT OFFICE.

FRANK EDMUND CALDWELL, OF WYNNEWOOD, OKLAHOMA.

MACHINE FOR MEASURING THE SPECIFIC GRAVITY OF A LIQUID.

Application filed September 11, 1923. Serial No. 662,073.

My invention relates to an improvement in the mechanical method of ascertaining the specific gravity of any reasonably non-viscous liquid, said specific gravity being indicated in terms of the ratio of its density to that of pure water or in degrees of the Baumé scale, or any similar system of measurement; and the objects of my improvement are: first, to provide a more compact and less fragile combination of sampling device, reservoir and float; second, to provide an automatically acting device for temperature correction; and third, to make possible when desired the continuous indication and automatic recording of the specific gravity of a running stream of liquid.

I attain these objects by the mechanism illustrated in the accompanying drawing, in which—

Figure 1:
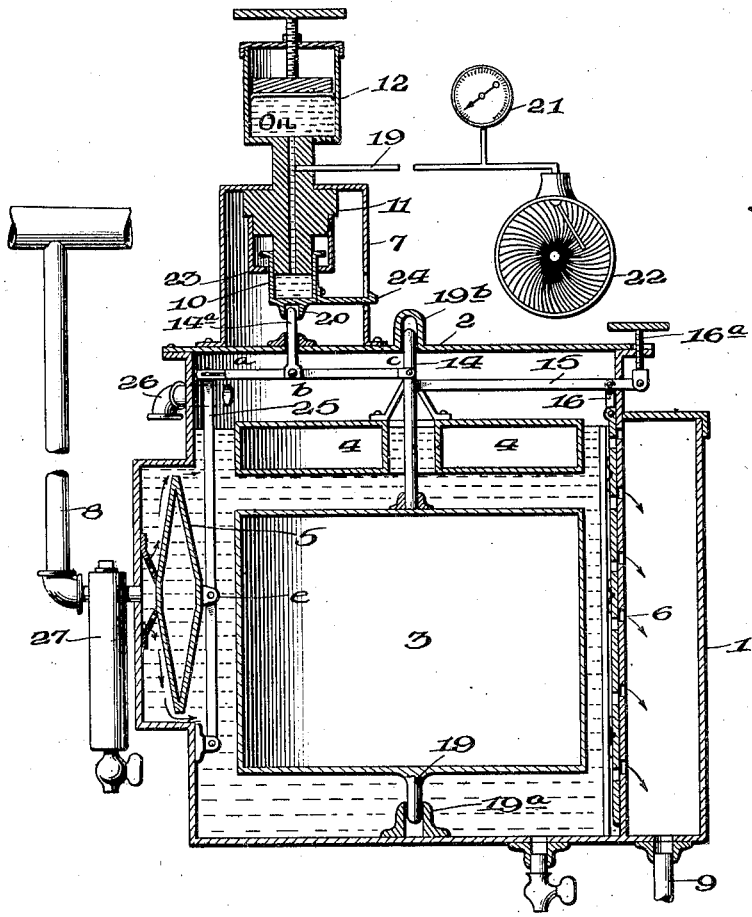
Figure 2:
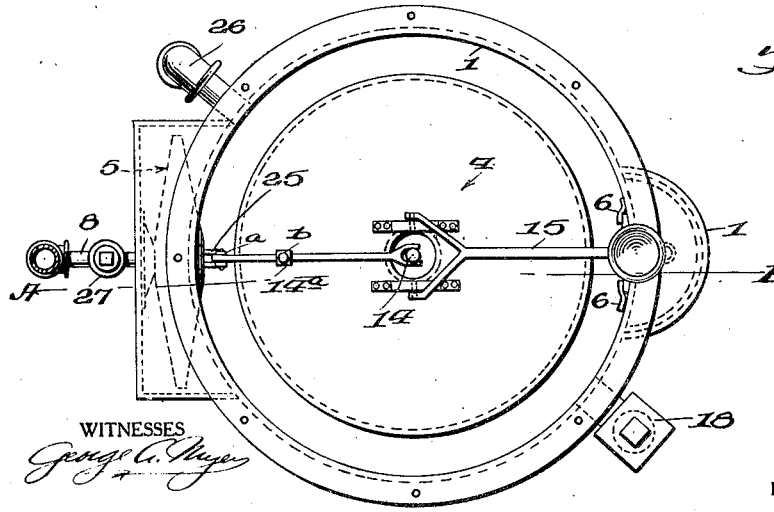

Figure 1 is a vertical section of the entire machine; Fig. 2 is a plan view as it appears after top cap and lid have been removed.

The reservoir 1 is fitted with a feed line 8 connecting it with the stream to be sampled and the momentum of the incoming fluid is dissipated by the temperature correction bulb 5 acting as a baffle. The fluid in passing out thru outlet valve 6 and drain line 9 is so regulated by float 4 thru levers 15 and 16 that a constant fluid level is maintained in the reservoir, any variation in this level being corrected by adjusting screw 16ª. Outlet valve 6 is so constructed that ports of gradually lessened dimensions are simultaneously opened from top to bottom of the reservoir, thus effecting uniform passage of the liquid thru all portions of said reservoir. A graduated gauge glass 18 is provided to facilitate adjustment of the fluid level.

Within the reservoir 1 and suspended in the liquid is the air-tight float-bulb 3 to which are rigidly attached a push rod 14 and guide rod 19. Guides 19ª and 19ᵇ are provided as shown to hold float in proper position.

Attached to the reservoir top plate 2 is a supporting device 7, which I prefer to make of the inverted cup type as shown, carrying the plunger 11, cylinder 10, oil pressure tube 19 and adjusting device 12, which operates in the following manner: On the under side of cylinder 10 is a socket 20 to receive the end of push rod 14ª. Float 3, being lighter than the liquid it displaces, is buoyed up by the liquid with a force proportional to the density (or specific gravity) of the liquid, this upward force being transmitted thru push rod 14, lever abc, and push rod 14ª, and resisted by the oil in cylinder 10 and its pressure being transmitted thru the hollow oil-filled tube 19 to the pressure-indicating device 21 or recorder 22. This device 21 or 22 may be any one of the commonly used types of pressure gauge and forms no part of my invention, except only in so far as it may be necessary to change its dial, chart, or proportions in order to conform to the purposes of this machine. It is assumed that such device must be so changed or re-designed that it will register the pressure applied to it in terms of the specific gravity of the liquid being tested. A retainer 23 is provided for limiting the downward movement of the cylinder 10 and preventing its separating from plunger 11. In order to adjust the position of cylinder 10 between its extreme limits and to take care of any leakage or expansion of oil in pressure tube 19 the adjusting device 12 is provided, which consists essentially of an auxiliary reservoir of oil from which more or less oil may be supplied to tube and cylinder by means of a plunger and screw as shown. The pointer 24 extending thru a slot in the supporting cap 7 is attached to cylinder 10 and moves with it, thus indicating the position of the cylinder.

Temperature correction bulb 5 is of a "bulged pancake" design, rigidly attached at point "d" to the side of reservoir 1 and filled with a liquid of high expansion coefficient. Since its volume is automatically increased with a rise in temperature of the liquid (or vice versa) its thickest horizontal dimension d—e increases at the same time, actuating lever 25. This has the effect of shortening levers ab and ac, increasing the ratio ac/ab, and compensating for the decrease in buoyant effect of the expanded liquid on bulb 3, thus resulting in approximately the same indication of specific gravity for any and all temperatures of the liquid.

Emergency overflow 26 is provided to prevent flooding of the apparatus in case of failure of outlet valve 6 to care for the flow properly.

A strainer and sediment bulb may be provided in the feed line as shown at 27 to prevent the entrance of foreign matter and consequent clogging of any working parts.

The circular form of reservoir and floats indicated in Fig. 2 is not a necessary feature of my invention but is used purely for purposes of symmetry. In fact, a slightly greater advantage is to be gained in actual operation from a rectangular form having its long side parallel to lever 15. I therefore do not limit my claim to any specified proportion in the form or shape of reservoir and floats, as these must be governed more or less by operating conditions.

The only instrument known or believed by me to have been in commercial use hitherto for measuring specific gravity of a liquid consists of a very fragile glass bulb known as a hydrometer, containing in its lower end some weighty material such as lead and in its upper end a graduated scale indicating the specific gravity by the depth to which the bulb sinks in the liquid. My invention does away with: (a) the nuisance and expense of breaking glass hydrometers; (b) the time and labor attendant upon the use of the common glass hydrometer; (c) inaccuracy due to the human element in properly allowing for liquid meniscus on the hydrometer scale, or in reading thru opaque liquids; (d) the use of correcting scale or specific gravity tables for making corrections for temperature.

I claim:

1. A machine for measuring the specific gravity of a liquid comprising in combination a feed line, a reservoir having an inlet opening and outlet opening and adapted to receive the liquid from said feed line, a float bulb movably mounted within the reservoir, a float mounted in the reservoir to maintain a constant level of the liquid therein, a pressure resisting mechanism mounted on said reservoir and supported by the same, outlet-valve mechanism adapted to permit uniform passage of the liquid through all portions of the reservoir, said float bulb, float, pressure resisting mechanism, and valve mechanism connected in pairs, each pair by a lever, and indicating means operably connected with said pressure resisting mechanism, whereby to provide continuous and automatic recording of the specific gravity of a running stream of liquid.

2. In a device of the character described, outlet valve mechanism for maintaining a constant volume of liquid in the liquid reservoir, and including a partition having a series of ports at different levels and a perforated valve plate for simultaneously varying the dimensions of said ports, whereby to effect uniform passage of liquid through all parts of the liquid reservoir.

3. A device as set forth in claim 2, the valve varying mechanism comprising a float, a lever operated by said float, connecting said lever with said valve plate, and means associated with the liquid reservoir for adjusting the valve plate whereby to regulate the volume of the liquid in the reservoir.

4. In a machine for measuring the specific gravity of a liquid, the combination with a liquid reservoir and the liquid therein, of a light weight float bulb movably mounted in said reservoir but completely immersed in the liquid and a pressure receiving and transmitting device mounted on said reservoir, and operable connections between said bulb and said pressure device whereby to resist the upward buoyant force of the said liquid upon said float bulb.

5. In a machine for measuring the specific gravity of a liquid, in combination, a liquid reservoir having a liquid inlet passage in one side, and the liquid therein, a liquid filled expansible temperature correction bulb mounted in said reservoir in the liquid, a float bulb immersed in the liquid, and movable in said reservoir, a pressure resisting device mounted on said reservoir, and a system of levers operatively connecting said temperature correction bulb, float bulb and pressure resisting device whereby any reasonable variation in temperature occurring equally and simultaneously in the liquid in the bulb and the reservoir liquid will cause no appreciable variation in the pressure applied to the aforesaid pressure resisting device.

6. In a device as set forth in claim 5, the temperature correction bulb being so disposed with respect to the inlet passage in the side wall of the reservoir to constitute a baffle for diverting the incoming liquids in all directions.

FRANK EDMUND CALDWELL.